United States Patent [19]
Drechsel

[11] Patent Number: 5,353,989
[45] Date of Patent: Oct. 11, 1994

[54] ROTATING IMPACT SPRINKLER

[76] Inventor: Arno Drechsel, Via Castel Mareccio 4, 39100 Bolanzo, Italy

[21] Appl. No.: 983,539
[22] PCT Filed: Jul. 15, 1991
[86] PCT No.: PCT/EP91/01324
  § 371 Date: Feb. 19, 1993
  § 102(e) Date: Feb. 19, 1993
[87] PCT Pub. No.: WO92/03230
  PCT Pub. Date: Mar. 5, 1992

[30] Foreign Application Priority Data
  Aug. 21, 1990 [IT] Italy ............... 85608A90

[51] Int. Cl.⁵ ............................... B05B 3/16
[52] U.S. Cl. ........................ 239/230; 239/233; 239/252
[58] Field of Search ............... 239/230–233, 239/252

[56]           References Cited
         U.S. PATENT DOCUMENTS 3,350,015 10/1967 Friedmann et al. ........... 239/230
  3,744,720  7/1973 Meyer ........................ 239/233
  4,193,548  3/1980 Meyer ........................ 239/230
  4,231,522 11/1980 Drechsel ..................... 239/233
  4,669,663  6/1987 Meyer ........................ 239/233
  4,813,605  3/1989 Fuller ........................ 239/233

FOREIGN PATENT DOCUMENTS 0097985  1/1984 European Pat. Off. .
  1151145  7/1963 Fed. Rep. of Germany .
  2653357  4/1991 France ........................ 239/233
  0593652  5/1959 Italy ........................... 239/233

Primary Examiner—Karen B. Merritt
Attorney, Agent, or Firm—Wolf, Greenfield & Sacks

[57]               ABSTRACT

A rotating impact sprinkler comprising a device for connecting the pressurized water column to a rotating joint which supports a rotating assembly which is formed by a tubular body with a nozzle for generating a jet, an oscillating arm and deflection element mounted at the end of the arm so as to interact with the jet. The deflection element comprises at least one main deflector which oscillates elastically in a direction which is transverse to the arm between a central equilibrium position, in which the surface effected by the jet is minimal, and at least one lateral abutment position, in which the surface effected by the jet is maximal. The change from the minimally effected surface to the maximal one is sudden, so as to instantly increase withdrawal of energy from the jet and generate impulsive forces on the deflector.

40 Claims, 6 Drawing Sheets

ROTATING IMPACT SPRINKLER

The present invention relates to a rotating impact sprinkler of the type used to perform irrigation on an entire circumference or on partial sectors.

Known impact sprinklers of this type are generally placed on trolleys or supporting frames and comprise means for connecting a pressurized water column to a rotating joint, which in turn supports an assembly which rotates about the axis of said joint. Said assembly is essentially formed by a tubular body which has, at one open end, an adapted nozzle for generating a jet which is inclined with respect to the axis of rotation of the assembly. Propulsion and jetbreaking means are mounted on the tubular body and are generally constituted by one or more arms which oscillate about an axis which is substantially perpendicular to the axis of rotation of the assembly and have one end suitable for periodically interacting with the jet. At said end affected by the jet, each oscillating arm is provided with one or more deflectors suitable for partially deflecting the jet, generating reaction forces which have components which are parallel and perpendicular to the axis of rotation of the assembly and cause a periodic oscillation of the arm and a stepwise rotary motion of the entire assembly.

In order to prevent the uncontrolled rotation of the assembly in excessively large incremental steps, which would not allow an effective irrigation, appropriate braking means are inserted in the rotation joint which supports the assembly and are intended to contrast the rotation of said assembly about its own main axis.

In order to perform irrigation on a limited angular sector it is necessary to periodically reverse the direction of rotation of the sprinkler about its main axis. Automatic mechanisms are normally provided for this purpose and are suitable for varying the angle of relative incidence of the deflector with respect to the jet, so as to reverse the direction of the reaction forces which act on the assembly in a direction which is perpendicular to its rotation axis. Said mechanisms are generally actuated by stroke limit abutments which can be arranged on the fixed part of the rotating joint at the ends of the irrigation sector.

An essential requirement for sprinklers of the above described type is that the rotation rate of the rotating assembly must be approximately constant as the pressure and flow-rate of the jet and the attitude of the sprinkler vary. In fact, if the axis of rotation of the sprinkler is inclined with respect to the vertical, the components of the reaction forces and of the braking forces may vary, altering the rotation rate of the sprinkler, with consequent modifications and non-uniformities in the irrigation conditions. Some sprinklers of the above described type are known which satisfactorily perform their task; DE-B-1151145, for example, discloses a sprinkler having a deflector member mounted on a rocking arm provided with a balance weight. These sprinklers, however, can be improved so as to eliminate some acknowledged disadvantages.

One of these disadvantages is constituted by the substantial non-uniformity in the operation of sprinklers at low water feed pressures, which become increasingly necessary in order to reduce facility management costs and in general to limit energy consumption. This non-uniformity in operation is furthermore always present in the initial startup step, since in practical use the pressure of the feed water must be increased gradually, passing from a minimum value to a maximum one. During this transient, the propulsion arm of the sprinkler, which is initially motionless, starts to oscillate with a limited frequency and extent which increase gradually up to the steady-state values. Correspondingly, the interruptions of the jet are initially nil or minimal and increase progressively until they become complete and constant. Now, if the sprinkler is not designed correctly, this transient condition can last for an excessively long and sometimes indefinite time, with the consequence that the jet is not interrupted and digs a hole in the ground, irreparably damaging the crops.

A further disadvantage of known sprinklers consists of the fact that the intervals for the adjustment of the oscillation frequency and of the rotation rate of the assembly are rather limited, unless the balancing of the oscillating arms is changed. In order to perform this operation, devices for modifying the position of the counterweights arranged on the arm are generally provided, but these mechanisms are very complicated and require the use of special tools or of universal implements which are not normally available in the place where the sprinkler is used.

The aim of the present invention is to overcome the disadvantages described above by providing an impact sprinkler which, by virtue of its characteristics of functionality and reliability, operates effectively and correctly in any operating and adjustment condition, even with extremely low feed pressures, as currently required in order to limit energy consumption.

A further object of the present invention is to provide an impact sprinkler which maintains a substantially constant rotation rate as the pressure and flow-rate of the water vary and as the inclination of the ground varies, even with considerable slope angles.

Another object of the present invention is to provide an impact sprinkler which achieves a self-limited energy withdrawal, i.e. which draws from the jet an amount of energy for propulsion which is inversely proportional to the total energy of the jet, so as to ensure regular operation in all conditions.

Another object of the present invention is to provide an impact sprinkler which has an adjustable rotation rate, by virtue of means mounted directly on the sprinkler, without requiring any further external equipment.

Another object of the present invention is to provide a substantially simple sprinkler which can be used by personnel having no particular knowledge of sprinklers and is such as to require very little maintenance, so as to be advantageous from a merely economical point of view.

This aim, these objects and others which will become apparent hereinafter are achieved by a rotating impact sprinkler of the type described in the introductory part.

Further characteristics and advantages of the invention will become apparent from the description of a preferred but not exclusive embodiment of the impact sprinkler according to the invention, illustrated only by way of non-limitative example in the accompanying drawings, wherein:

FIG. 4 is a perspective view of a detail of the sprinkler according to the invention;

Figure 1:
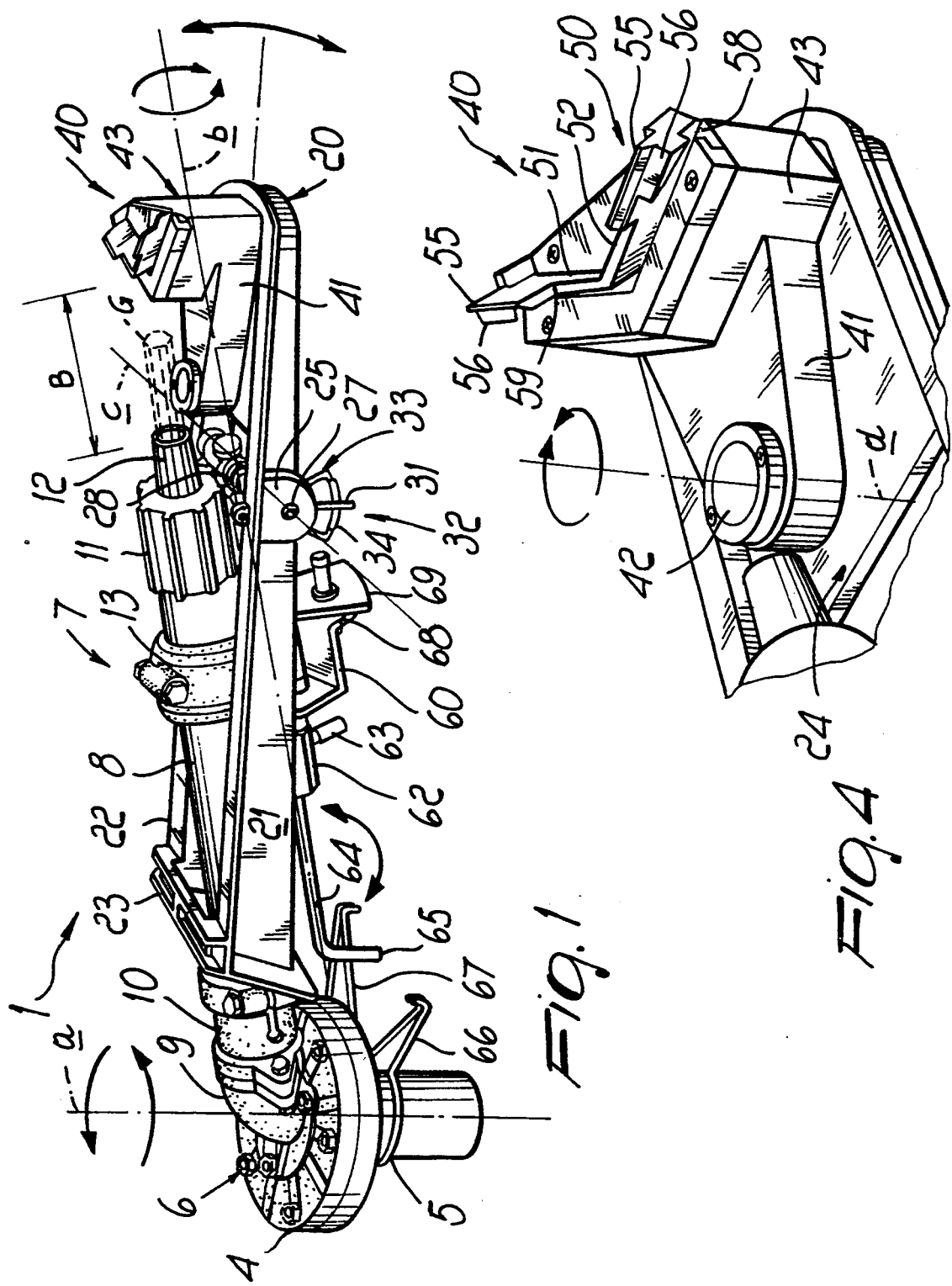
FIG. 1 is a general perspective view of the sprinkler according to the invention.
Figure 2:
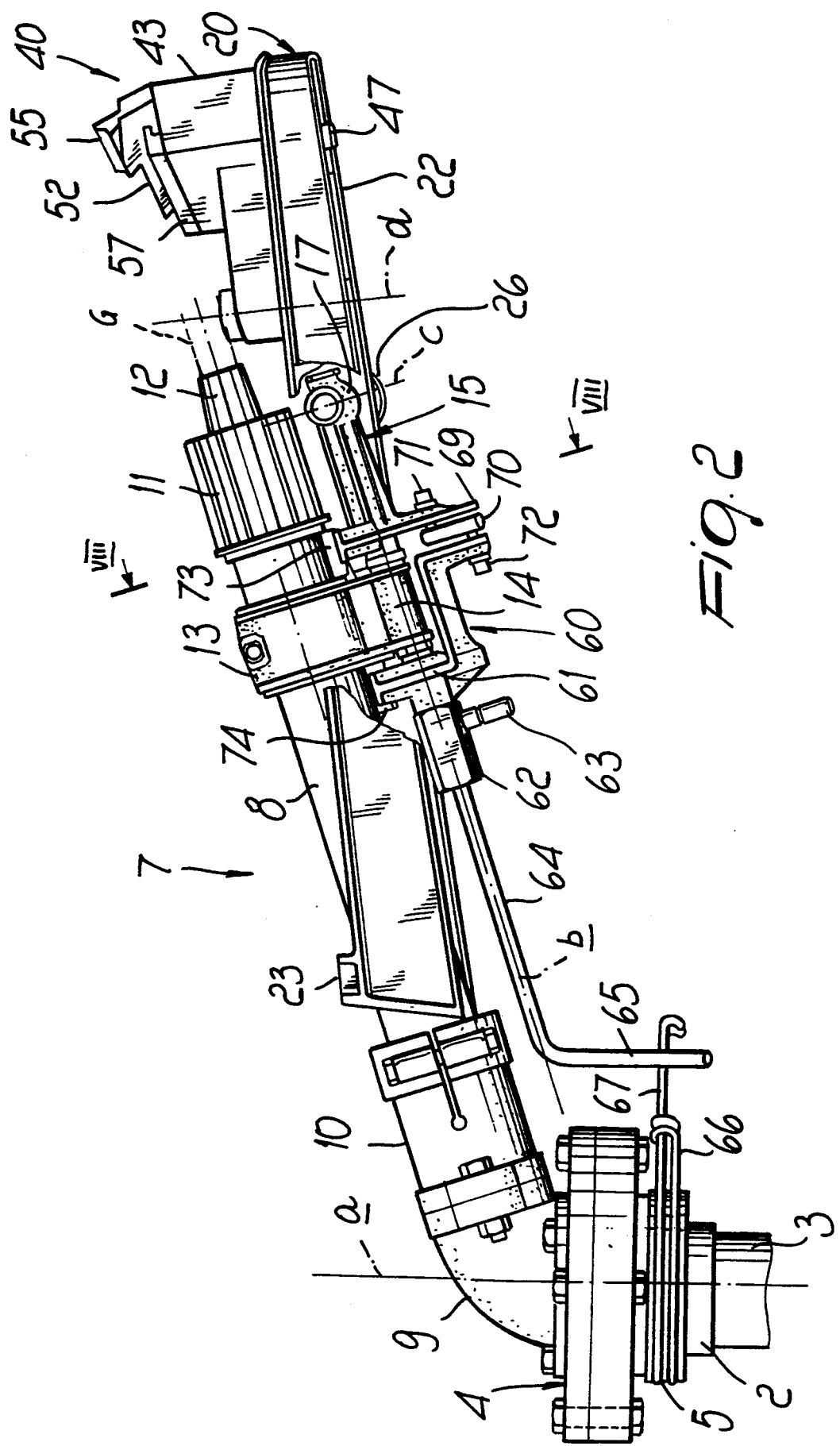
FIG. 2 is a lateral general view of the sprinkler of FIG. 1.
Figure 3:
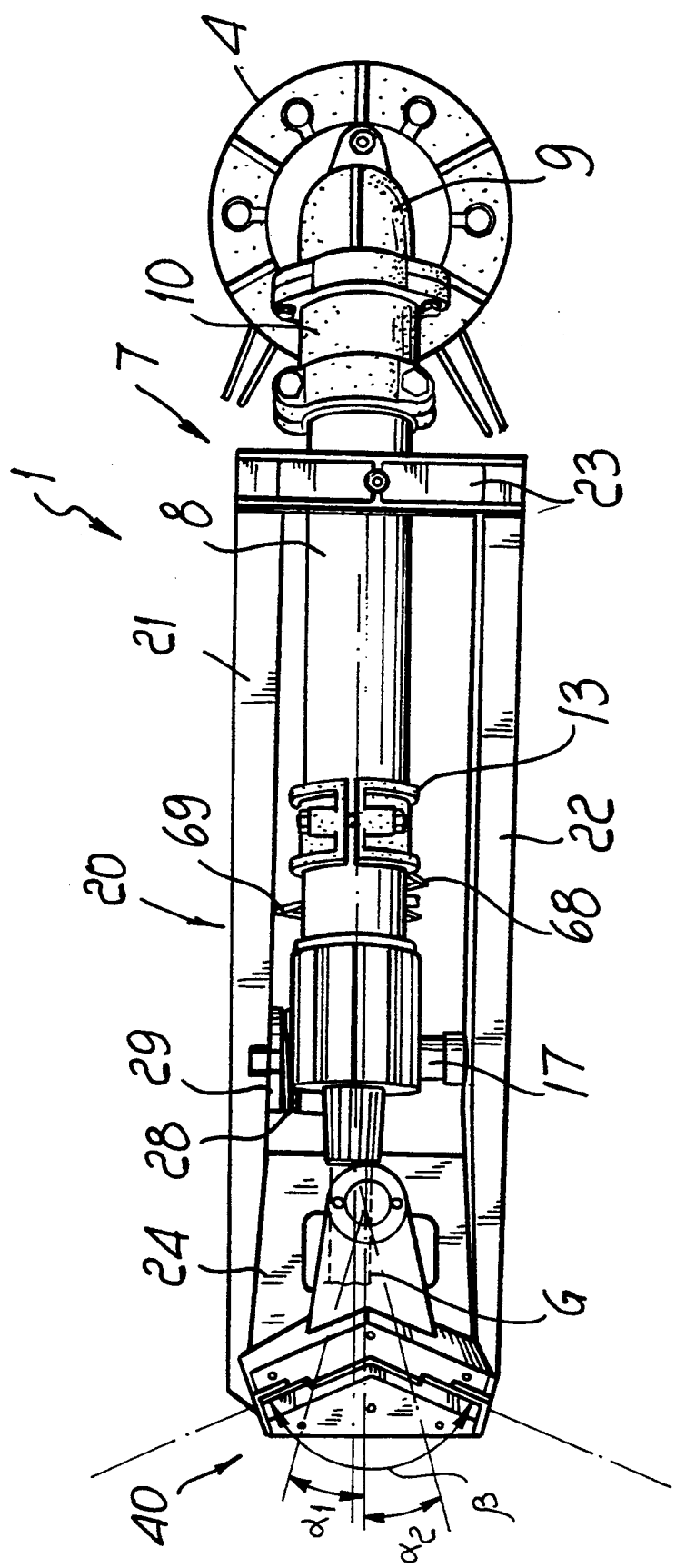
FIG. 3 is a general top view of the sprinkler of FIG. 1.

With reference to the above figures, the impact sprinkler according to the invention, generally indicated by the reference numeral 1, is connected by means of a connecting element 2 to a pipe 3 for feeding pressurized water. A rotating joint or bearing, generally indicated by the reference numeral 4, is fixed on the connecting element 2 and comprises a fixed lower portion 5, which is bolted to the element 2, and an upper movable portion 6, which supports a rotating assembly generally indicated by the reference numeral 7. The rotation axis a of the joint 4, which is approximately but not necessarily vertical, determines the rotation axis of the assembly 7.

The assembly 7 comprises a tubular body or barrel 8 which is connected to the upper portion 6 of the joint 4 by means of an elbow coupling 9, which has an angle θ between the outlet and the inlet so as to incline the barrel 8 with respect to the vertical, and a substantially cylindrical connecting stub pipe 10. A nozzle or nosepiece 12 is fixed to the tubular body 8 at its end portion by means of a ring 11 or the like and has an adapted profile and internal diameter so as to obtain a jet with a preset flow-rate and range according to the pressure of the water.

Figures 8, 9:
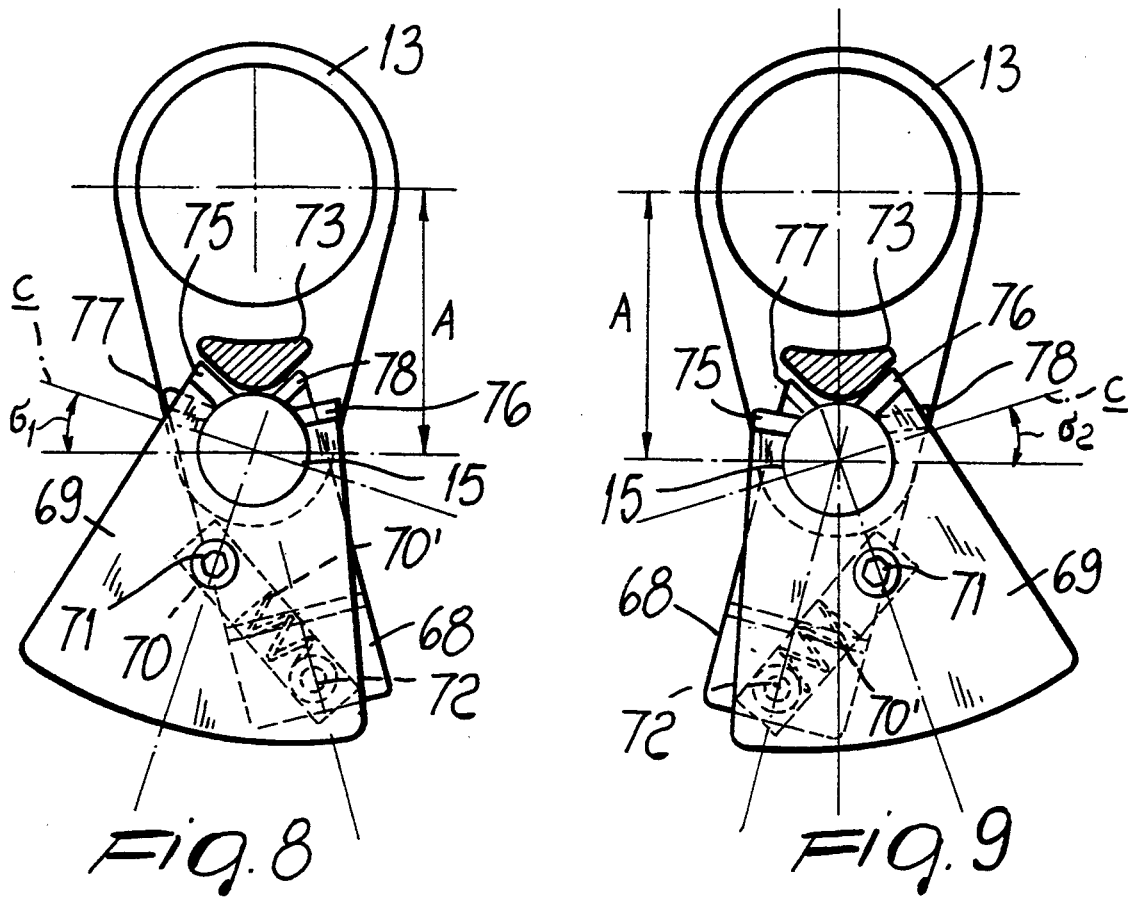
FIG. 8 is a partially sectional schematic view of a detail of FIG. 2 in a first extreme position, taken along the plane indicated by VIII—VIII.
FIG. 9 is the same schematic view as FIG. 8 with the device in a second extreme position.

A support 13 is disposed on the tubular body 8 at the nozzle 12 and has, at one end, a cylindrical seat 14 which defines a longitudinal axis b which is substantially parallel to the axis of the tubular body 8 and is spaced therefrom by a center distance A indicated in FIGS. 8 and 9.

A shaft, not illustrated in the drawings, can freely rotate in the cylindrical seat 14; a spider 15 is keyed thereon and defines a tubular median portion 16 and a head 17 with an axis c which is substantially perpendicular to the axis b of the seat 14.

An oscillating arm 20 is pivoted on the head 17 and, in an exemplifying form illustrated in the drawings, is constituted by an approximately rectangular frame which is formed by two lateral members 21, 22, arranged on opposite sides with respect to the barrel 8, which are rigidly connected to one another by a rear cross-member 23 and by a front plate 24. The arm may pivot by means of a pair of lateral supports 25, 26 which are crossed by a single axle or by lateral pivots 27. Initially, the arm 20 is in a substantially horizontal position, with the cross-member 23 lowered so as to abut on the tubular body 8 and with its oscillation axis c inclined laterally, as illustrated in FIGS. 2, 3, 8 and 9. In order to keep the arm in this equilibrium position, regardless of the inclination of the rotation axis a with respect to the ground, and to furthermore allow to adjust the oscillation frequency of the arm, there are first return means, which exert on said arm a torque which is counter-clockwise in FIG. 2. Said return means can be of the elastic type, for example formed by a helical spring 28 which is partially enclosed between two opposite cylindrical bushes 29, 30; the first bush is rigidly associated with the member 21 of the arm 20, the second one is rigidly associated with the head 17 of the support 15. An end of the spring 28, which is not visible in the drawings, is fixed to the bush 30, and the other end 31, which extends radially with respect to the axis c, is adjustably associated with the bush 29. For this purpose, the bush 29 has a planar radial extension 32 shaped like a circular sector, with a cylindrical edge 33 which has angularly offset seats 34 in which the radial end 31 of the spring 28 can be engaged. Thus, by selectively placing the end 31 of the spring in the various cavities 34 of the edge 33 of the planar extension 32, it is possible to adjust the intensity of the return torque on the arm 20, with the effect of altering the extent and frequency of abutment thereof. The above described elastic return means can furthermore be coupled to eccentric-mass return means which can move along said arm in order to adjust the return torque.

Advantageously, a main deflector 40 is arranged on the plate 24 at a distance B from the nozzle 12 in equilibrium conditions so as to periodically interact with the jet G. In this step, the jet exerts hydrodynamic reaction forces on said deflector and is furthermore interrupted and broken up.

The deflector 40 may comprise an elongated body 41, having an approximately triangular plan shape, with its vertex pivoted to the plate 24 by means of a pivot 42 with an axis d which is substantially perpendicular to said plate. The body 41 can thus rotate transversely to the longitudinal direction of the arm 20 in a plane which is substantially parallel to its oscillation axis c. At its end which is opposite to the pivoting end, the elongated body 41 has a prism-shaped expanded portion 43 which defines a support for a deflection structure 50 which will be described in detail hereinafter.

Figure 5:
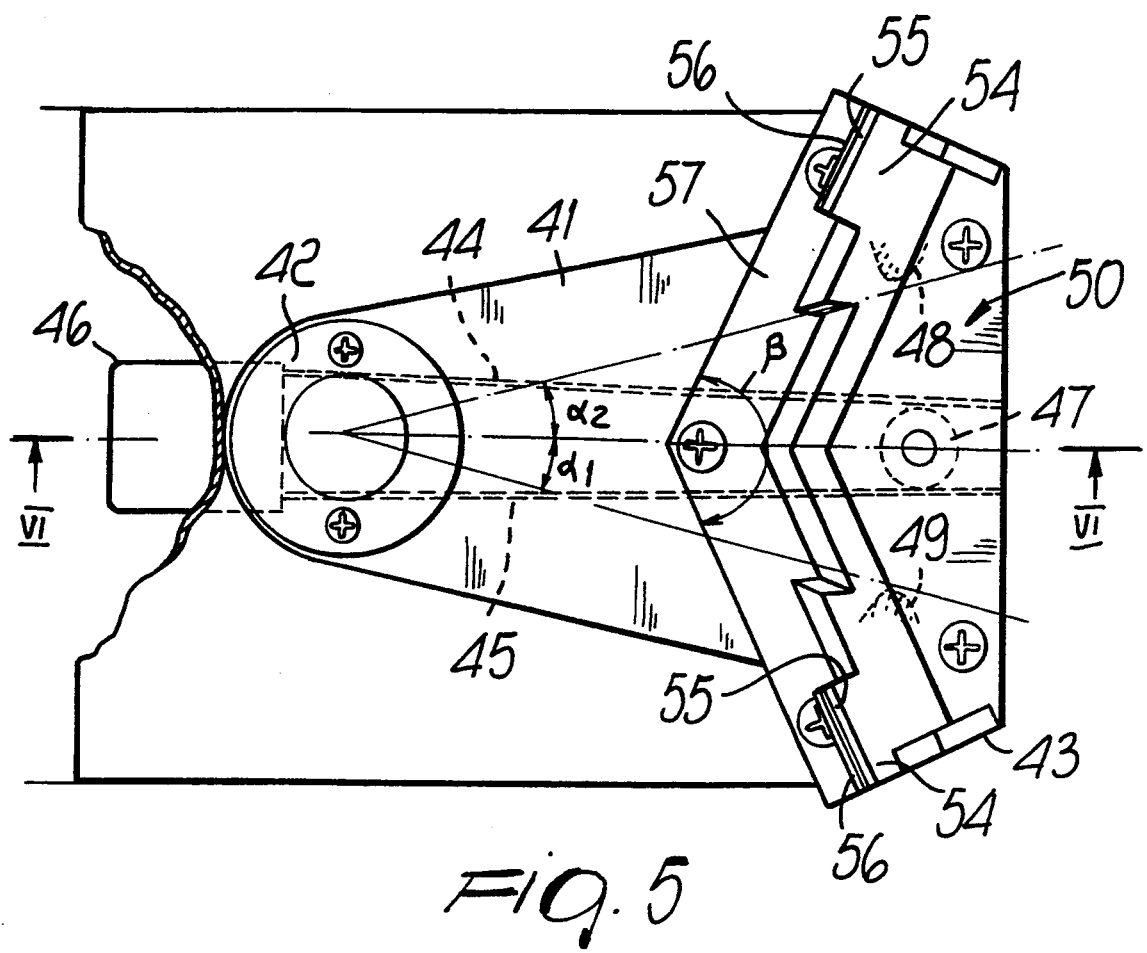
FIG. 5 is a top view of the detail of FIG. 4.
Figure 6:
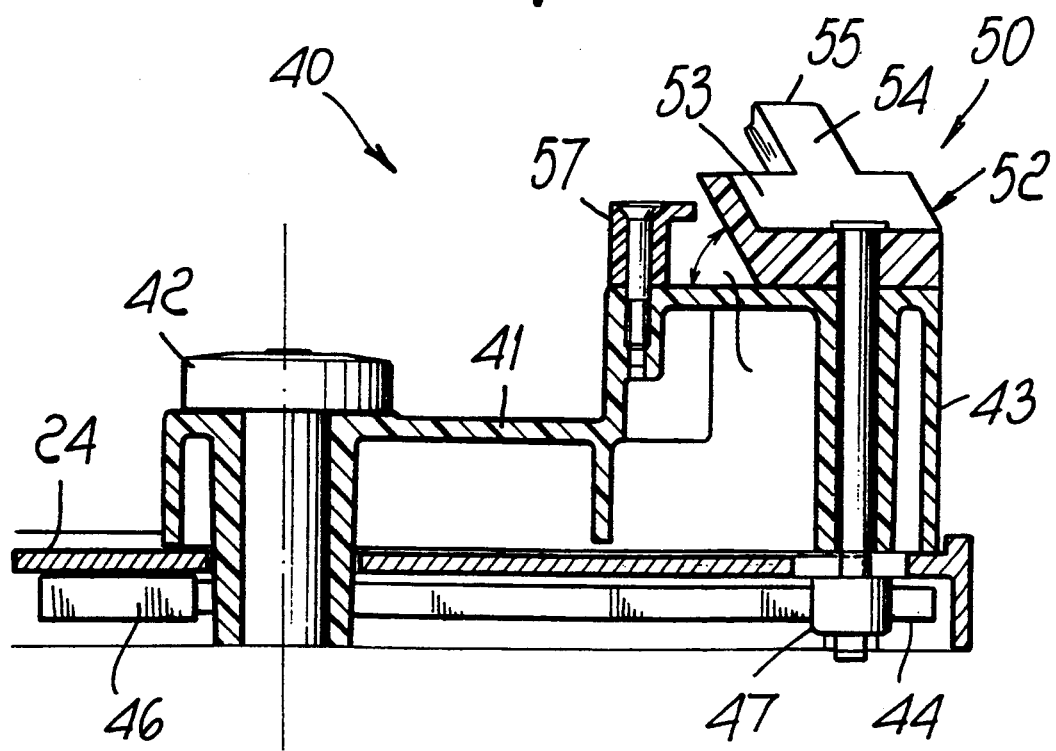
FIG. 6 is a sectional side view of the detail of FIG. 5, taken along a vertical plane indicated by VI—VI.

Second return means are conveniently provided for keeping the deflector 40 in a central position aligned with the longitudinal direction of the arm. An exemplifying embodiment of said second return means may consist of a pair of longitudinal elastic laminas 44, 45 which are retained by a central base 46 anchored on the supporting plate 24 and act on opposite sides on a central pivot 47 which is fixed below the prism-shaped expanded portion 43. Lateral stroke limit abutments 48, 49, schematically indicated in FIG. 5 and intended to limit the oscillation angles α1 and α2 of the deflector 40 on one side and the other with respect to the central equilibrium position, can furthermore be conveniently provided on the plate 24. The angles α1 and α2 can be identical or, optionally, different so as to differentiate the rotation rate in the two directions. The deflector 40 can thus oscillate elastically about its central equilibrium position toward and away from two lateral external abutment positions.

The structure 50 substantially comprises a pair of lateral deflection surfaces 51, 52 which converge and are substantially symmetrical with respect to a longitudinal plane of the deflector which passes through the axis d, so as to form an angle β between them and an angle Γ with respect to the oscillation plane of the deflector. The latter angle is necessary in order to facilitate the gradual conveyance of the water without causing a sudden flow-back of the jet. The angle β can furthermore be greater or smaller than 180°, so that the overall shape of the deflection structure 50 is wedge-like, respectively concave or convex.

In each of the lateral deflection surfaces 51, 52 it is possible to identify a first innermost or median portion 53, which has a certain front cross-section with respect to the jet, and a second outermost portion 54, which has a larger front cross-section than said first portion.

Experimentally, it has been possible to verify that optimum values of the angles $\alpha1$ and $\alpha2$ can be comprised between 5° and 30° and are preferably equal to approximately 15°. The angle $\beta$ can be comprised between 60° and 270° and is preferably equal to approximately 130°. The angle $\Gamma$ can be comprised between 20° and 150° and is preferably equal to approximately 60°. This last angle furthermore functionally depends on the value of the center distance A, which can vary between 0 and 120 mm and is preferably equal to 60 mm. The value of B is not binding, and can be determined from the other parameters and from the length of the deflector 40.

Conveniently, according to the invention, the median portions 53 of each deflection surface 51, 52 are arranged so as to be affected by the jet when the deflector is in its approximately central position, whereas the outer portions 54 are affected by the jet when the deflector is proximate to one of its lateral abutment positions, on one side or on the other with respect to the central position. In order to align the jet with only one of the lateral deflection surfaces 51, 52, the axis c of oscillation of the arm is alternatively inclined by angles o1 and o2, performing, corresponding rotations of the support 15, as described in detail hereinafter.

Advantageously, the front surface of the median portions 53 of the deflection surfaces 51, 52 has such dimensions that the force F1 generated by the jet is sufficient to overcome the contrast force of the second return means which act on the deflector, causing their rotation on the side opposite to the side of the portion affected by the jet, even for very low values of the energy of said jet. Said force F1, however, is smaller than the return force of the first elastic means which act on the arm; said arm, in this step, is therefore kept in its idle position and in any case does not start to oscillate yet.

The force F1, however, moves the deflector away from its central position, so as to expose to the jet one of its lateral portions 54, which has such dimensions as to produce on the arm a force F2 which is greater than the return force, which causes the movement of the arm away from its idle position.

The increase in the front cross-section from the minimum value to the maximum one is furthermore sudden, i.e. discontinuous and not progressive, so that the forces generated on the arm are impulsive, with a peak value which ensures, in any case and with any attitude of the sprinkler, the beginning of the oscillation of the arm, preventing possible instability situations.

Figure 7:
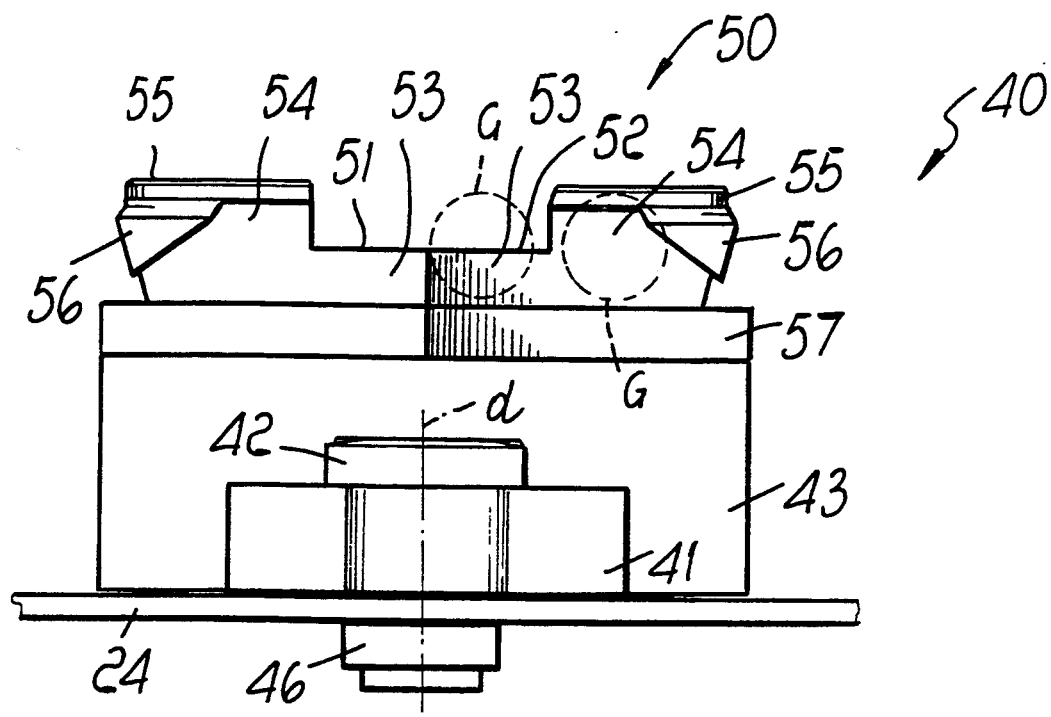
FIG. 7 is a rear view of the detail of FIG. 5.

This configuration is clearly visible in FIG. 7, wherein it can be seen that the edge of the structure 50, seen frontally, is suddenly depressed and forms, in the central region defined by the inner portions 53, a step with respect to the upper edge of the outer portions 54.

In order to further reduce the risk of instability, the upper edges of the lateral portions 54 have planar or slightly curved surfaces 55 with an inclination suitable for partially deflecting the jet upward at the beginning of interaction, generating a reaction force which is directed downward and imposes an impulsive oscillation torque to the arm.

Two conveyance fins 56 are furthermore provided proximate to the lateral edges of the surfaces 54 and have lower deflection surfaces directed outward and downward.

A channeling element 57 is conveniently arranged on the edge of the prism-shaped expanded portion 43 which is further backward with respect to the direction of the jet; its height is less than that of the deflection structure 50, and it faces said structure so as to define, together with the deflection surfaces 51, 52, two connected collection channels 58, 59 which diverge outward and have open ends. Operatively, the water of the jet which wets the surfaces 51, 52 is deflected downward and is collected in the channels 58, 59 so as to be directed outward and forward with respect to the jet.

The sprinkler according to the invention has means for reversing the direction of rotation of the rotating assembly 7 after covering a preset angle. For this purpose, an approximately Z-shaped bracket 60 is pivoted on the oscillation axis b and has a longitudinal portion which is adjacent to the seat 14 of the support 13. An elongated nut 62 is defined at the rear transverse end 61 of the bracket 60 and retains an actuation rod 64 by means of a stop screw 63. The free end 65 of the rod 64 is conveniently shaped so as to be able to interact with two radial stroke limit protrusions, constituted for example by the folded ends of two open rings 66, 67 which are rigidly associated with the fixed lower portion 5 of the joint 4.

The front transverse end 68 of the bracket 60 faces a transverse plate 69 of the spider 15 and is connected thereto by means of an elastic connecting rod 70. Said connecting rod 70 is pivoted to the plate 69 by means of a pivot 71 and is articulated to the front portion 68 of the bracket 60 by means of a pivot 72 which can move longitudinally along the connecting rod 70 and in contrast with a spring 70'. By virtue of this arrangement, the mechanical connection between the bracket 60 and the spider 15 is elastic and is such as to cause the relative rotation of the two elements in opposite directions and with a snap-action movement, so as to occupy two mutually spaced positions.

By virtue of this arrangement, the axis of the head 17 of the support 16, and therefore the oscillation axis c of the arm 20, are caused to selectively occupy two positions which are inclined on opposite sides with respect to a substantially vertical plane, due to the interaction of the end 65 of the actuation rod 64 with the fixed abutments 66, 67, which are angularly offset with respect to the main rotation axis a of the sprinkler. Two stroke limit blocks 73, 74 are defined on the opposite ends of the bracket 13 in order to delimit the angles o1 and o2 of inclination of the spider 15 and consequently of the oscillation axis c of the arm 20; the abutments 75, 76 of the plate 69 and the abutments 77, 78 of the rear end 66 of the bracket 60 abut against said blocks 73, 74 respectively, as illustrated in FIGS. 8 and 9.

The operation of the sprinkler is substantially apparent from what has been described above.

Initially, the oscillation axis c of the jet is inclined to one side by an angle o1 or o2, arranging one of the lateral deflection surfaces 51, 52 of the main deflector 40 in a position for interacting with the jet. Said jet initially affects the central portion 53 of one of the deflection surfaces of the deflector, causing the rotation thereof about its axis d toward a lateral abutment position. Following this rotation of the deflector, the jet strikes the outer portion 54 and the upper edge 55 of the deflection surface of the deflector, with an instant increase in front cross-section, generating a sudden impulsive force with both vertical and horizontal components which are more than sufficient to cause both the oscillation of the arm and the incremental rotation of the assembly, regardless of the value of the energy of the jet.

After the assembly 7 has performed a preset rotation about the axis a, the motion reversal mechanism acts on the oscillation axis c of the arm 20 so as to incline, on the side opposite to the initial one, and orientate the other one of the lateral surfaces 51, 52 so as to cause the rotation of the deflector and of the assembly in the direction opposite to the initial one.

Figure 10:
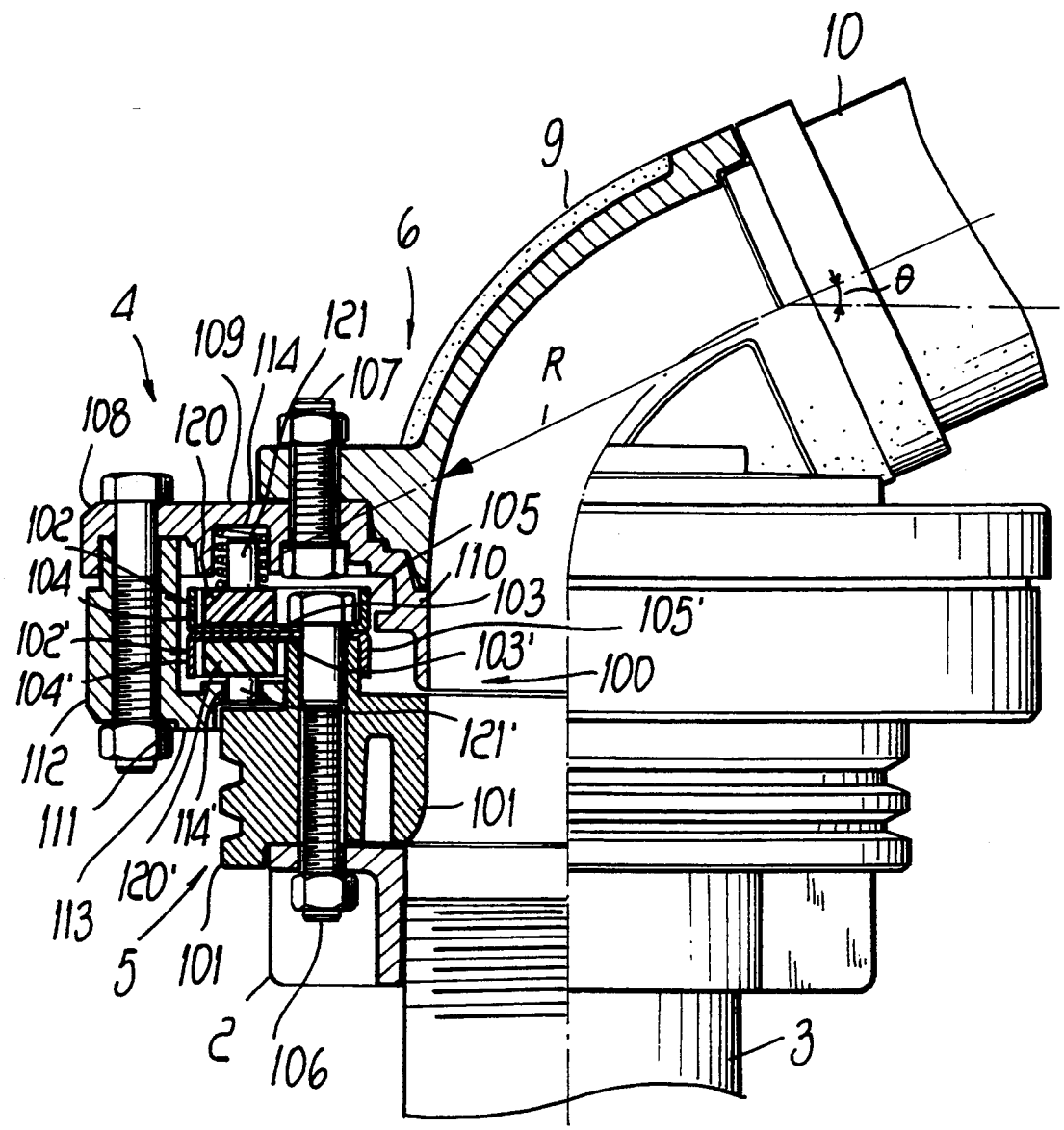
FIG. 10 is a partially enlarged sectional view of another detail of the sprinkler according to the invention, taken along a vertical plane which passes through the axis of rotation of the assembly.

FIG. 10 illustrates a self-adjusting brake structure, generally indicated by the reference numeral 100, particularly but not exclusively intended for use for the impact sprinkler according to the invention. The connecting element 2 fixed to the water feed pipe 3 can be of the flanged type or of the type with an inner thread, made of brass or of another equivalent material, and is anchored to a torus-like body 101 made of aluminum or the like, with a tapered internal surface which is connected to the connecting element 2.

A pair of braking disks 102, 102' made of stainless steel are arranged on the torus-like body 101; said disks have planar portions 103, 103' and inner and outer cylindrical annular portions, respectively 104, 104' and 105, 105'. The braking disks, the torus-like body and the flange are mutually rigidly coupled by means of bolts 106 or the like so as to define, as a whole, a stationary or fixed portion 5 of the joint.

In the upper portion of the figure, the elbow coupling 9 is fixed by means of bolts 107 to a cover 108 which has a planar portion 109 and a cylindrical tubular portion 110 with an internal diameter which is equal to that of the torus-like body 101.

The cover 108 is in turn anchored to a bottom 111 with a cylindrical lateral portion 112 and a planar portion 113. On the respective planar portions 109 and 113, which face the planar surfaces 103, 103' of the braking disks 102, 102', the cover 108 and the bottom 111 have respective series of cylindrical cavities 114, 114' which are angularly spaced. Two braking rings 120, 120' are interposed between the disks and the planar walls of the cover and of the bottom; said rings are made of wear-proof synthetic material and have cylindrical protrusions or dowels 121, 121' which engage in the respective cavities 114, 114', so as to ensure the traction of the rings 120, 120' by the rotating portion of the joint. Helical springs 130 are furthermore provided in the cavities 114 for the dowels 121 of the upper ring 120 and exert on the upper braking ring 120 a compression force against the upper disk 102.

The assembly constituted by the elbow coupling 9, the cover 108, the bottom 111 and the braking rings 120, 120' constitutes the rotating part of the joint. By virtue of the hydraulic pressure, said rotating part is pushed upward, forcing the lower ring 120' against the lower disk 102' with a pressure which is proportional to that of the water. The friction between the upper ring 120 and the upper disk 102 is instead always ensured by the compression force of the springs 130, which operate even with low pressures and regardless of the attitude of the sprinkler.

Conveniently, according to the invention, the angle of incidence $\theta$ and the configuration of the elbow coupling 9 are preset so that the line of action of the reaction force R generated by the jet on the barrel is directed substantially toward the region of contact of the rings and of the disks and also acts on the cylindrical lateral surfaces of these elements.

The simultaneous presence of all these forces ensures that the braking action on the joint is self-adjusted and substantially proportional to the pressure of the water as well as to the composition of the reaction forces which act on the sprinkler, achieving one of the essential objects of the invention.

It is furthermore noted that the line of action of the resultant of the reaction forces R on the joint 6 has the minimum lever arm allowed by the geometry of the system, producing an overturning torque which is centered in an axial region of the joint, with consequent minimal stresses and local deformations of said gaskets.

The sprinkler and the rotating joint thus conceived are susceptible to numerous modifications and variations, all of which are within the scope of the inventive concept expressed by the accompanying claims; all the details may furthermore be replaced with technically equivalent elements. By way of example, the oscillating arm, instead of being constituted by a frame in a central position, can be constituted by a single elongated body pivoted laterally to the barrel. Similarly, the main deflector, instead of having a pair of lateral surfaces, may have only one of said surfaces, suitable for causing stepwise rotation in a single direction; its pivoting axis may furthermore be arranged forward or backward with respect to the deflection structure. Moreover, the braking rings inserted in the rotating joint can be executed in a plurality of separate segments instead of in a monolithic structure.

I claim:

1. A rotating impact sprinkler, comprising means for connection to a pressurized water pipe, a rotating joint associated with said connecting means to support an assembly which can rotate about a first axis, said assembly being formed by a tubular body with an inlet and an outlet, a nozzle arranged at the outlet of said body to generate a jet, braking means arranged inside said joint to contrast the rotation of said assembly in a controlled manner, an oscillating arm which is pivoted to said body about a second oscillation axis which is substantially perpendicular to the first axis, deflection means which are mounted at one end of said arm in such a position to periodically interact with the jet to break it and draw at least part of its energy, first return means for returning said oscillating arm toward a position in which it interacts with said jet, the improvement consisting in that said deflection means comprises a deflector which can elastically move with respect to the arm in a direction which is transverse to the longitudinal extension thereof so as to periodically oscillate between a substantially central equilibrium position in which the surface of the deflector partially intersecting the jet has a front cross-section which is minimal, and at least one lateral abutment position in which the surface of the deflector partially intersecting the jet has a front cross-section which is maximal, the variation in front cross-section in passing from said minimal value to said maximal value at each oscillation of the deflector being sudden so as to instantaneously increase the withdrawal of energy from the jet and generate impulsive forces on the deflector and consequently on the arm regardless of the jet's energy.

2. The sprinkler according to claim 1, further including a second return means which tends to keep said deflector in said substantially central position to contrast its movement toward a lateral abutment position on one side or on the other with respect to said substantially central position.

3. The sprinkler according to claim 2, wherein said second return means comprises a pair of longitudinal elastic laminas which are rigidly associated with a plate forming a support for said deflector and act on opposite sides on a central pivot which is fixed below an end of said body which forms the base for said monolithic deflection structure.

4. The sprinkler according to claim 1, wherein the oscillation direction of said deflector is substantially parallel to a plane which is parallel to said arm and passes through its oscillation axis (c).

5. The sprinkler according to claim 4, wherein said deflector comprises at least one deflection surface which has an angle of inclination ($\Gamma$) with respect to the plane of oscillation of the deflector so as to determine reaction forces having components which are substantially perpendicular and parallel to the oscillation axis of the arm.

6. The sprinkler according to claim 5, wherein said at least one deflection surface of the deflector comprises at least one first deflection portion and at least one second deflection portion which are mutually adjacent and are intended to be struck by the jet when said deflector is respectively in said central position and in said at least one lateral abutment position.

7. The sprinkler according to claim 6, wherein a front cross-section of a first deflection portion has such dimensions as to in any case draw from the jet an amount of energy which is sufficient to progressively move the deflector away from its central position toward a lateral abutment position, converting said energy into a force (F1) which is greater than the contrast force of a second return means.

8. The sprinkler according to claim 6, wherein a front cross-section of said second portion has such dimensions as to draw from the jet an amount of energy which is sufficient to determine the instantaneous oscillation of the arm and the rotation of the assembly with preset extent and abutment frequency, converting said energy into a force (F2) which is greater than the contrast force of said first return means.

9. The sprinkler according to claim 8, wherein said deflector is rotatably mounted on said arm so as to oscillate about a third axis (d) which is substantially perpendicular to the second axis (c) with preset angular strokes ($\alpha 1$, $\alpha 2$) with respect to said central position which is substantially aligned with the arm.

10. The sprinkler according to claim 9, wherein said deflector comprises a substantially elongated main body which has one end pivoted to said arm, the other end forming a supporting base for a monolithic deflection structure as substantially defined by said at least one deflection surface.

11. The sprinkler according to claim 10, wherein said monolithic deflection structure comprises a pair of deflection surfaces which are mutually adjacent, are inclined by a preset angle ($\beta$) and are substantially symmetrical with respect to the longitudinal axis of said body, with said at least one first portion arranged inward and said at least one second portion arranged outward, so as to define a substantially wedge-shaped structure.

12. The sprinkler according to claim 1, wherein said arm is defined by a substantially elongated frame which is formed by at least one lateral member which defines a rear cross-member and a front plate which forms a support for said main deflector.

13. The sprinkler according to claim 12, further including a second return means which tends to keep said deflector in said substantially central position, said second return means comprising a pair of longitudinal elastic laminas which are rigidly associated with said plate and act on opposite sides on a central pivot which is fixed below the end of said body which forms the base for said monolithic deflection structure.

14. according to claim 11, wherein the angle of inclination ($\Gamma$) of said two deflection surfaces with respect to the plane of oscillation of the deflector is a function of said center distance (A), said angle of inclination is approximately 60°.

15. The sprinkler according to claim 11, wherein said preset angle ($\beta$) is between 60° and 270°.

16. The sprinkler according to claim 15, wherein said preset angle is approximately 130°.

17. The sprinkler according to claim 11, wherein each of said deflection surfaces furthermore comprises, at said at least one second portions, an upper edge inclined upward so as to impart to said arm a further downward force which tends to eliminate any risk of instability.

18. The sprinkler according to claim 17, further including a pair of conveyance elements which are arranged proximate to lateral edges of said second portion, said conveyance elements having lower conveyance surfaces which are inclined downward.

19. The sprinkler according to claim 18, wherein said monolithic deflection structure includes a channeling element which faces a base of said deflection surfaces so as to form a pair of collection channels which are directed downward and outward.

20. The sprinkler according to claim 1, wherein said oscillation axis (c) of said arm is defined by a transverse portion of a spider-shaped support which has a longitudinal portion which can rotate about a fourth axis (b) which is substantially parallel to a longitudinal axis of said tubular body and has a preset center distance (A) with respect to said tubular body.

21. The sprinkler according to claim 20, wherein said center distance (A) is between 0 and 120 mm.

22. The sprinkler according to claim 20, wherein said first return means comprises a helical torsion spring which has one end rigidly fixed to a head of said spider shaped support and a second end which is selectively engageable in a series of seats defined in angularly offset positions of a bush which is rigidly associated with said arm, so as to vary the contrast force which acts on the latter.

23. The sprinkler according to claim 20, further including means for reversing the direction of rotation of the assembly, said reversal means comprising a bracket which has one end pivoted to said fourth axis of rotation (b) of said spider-shaped support.

24. The sprinkler according to claim 23, wherein an actuation rod is rigidly fixed at an end of said bracket which is opposite to the pivoting end, said rod having a free end which is suitable for engaging a pair of angular abutments which are rigidly associated with a fixed portion of said joint, so as to cause the rotation of said spider-shaped support and consequently of said axis of oscillation (c) of the arm by a preset angle on one side (o1) or on the other side (o2) with respect to a substantially vertical plane, so as to correspondingly expose a surface of said deflector.

25. The sprinkler according to claim 20, wherein said center distance is approximately 60 mm.

26. The sprinkler according to claim 20, wherein the angle of inclination ($\Gamma$) of said deflector surface with respect to the plane of oscillation of the deflector is a function of said center distance (A), said angle of inclination is approximately 60°.

27. A rotating impact sprinkler, comprising: means for connection to a pressurized water pipe;
a rotating joint associated with said connecting means to support an assembly which can rotate about a first axis, said assembly being formed by:
a tubular body with an inlet and an outlet;
said rotating joint having a fixed lower portion which is coupled to said pressurized water pipe and a movable upper portion which is coupled to said tubular body by means of at least one elbow coupling;
a nozzle arranged at the outlet of said body to generate a jet;
braking means arranged inside said joint to contrast the rotation of said assembly in a controlled manner;
said braking means having a pair of opposite disks which are rigidly fixed to said fixed lower portion and a pair of braking rings which are rigidly associated with said movable upper portion and act on said disks on opposite sides thereof;
an oscillating arm which is pivoted transversely to said body about a second oscillation axis which is substantially perpendicular to the first axis;
deflection means which are mounted at one end of said arm in such a position as to periodically interact with the jet to break it and draw at least part of its energy;
first return means for returning said arm toward a position in which it interacts with said jet; and
said deflection means comprise a deflector which can move in a direction which is transverse to said arm so as to oscillate elastically between a substantially central equilibrium position, in which a surface of the deflector which is struck by the jet is minimal, and at least one lateral abutment position, in which the surface of the deflector affected by the jet is maximal, the variation in the surface cross-section in passing from said minimal value to said maximal value being sudden so as to instantaneously increase the withdrawal of energy from the jet and generate impulsive forces on the deflector regardless of the jet's energy.

28. The sprinkler according to claim 27, wherein said disks have a substantially U-shaped radial cross-section, with a planar annular portion and a pair of cylindrical edges.

29. The sprinkler according to claim 27, wherein said braking rings are defined by annular bodies which have a series of substantially cylindrical angularly spaced pivots arranged on one of their planar faces and intended to be accommodated in corresponding cavities defined in said movable upper portion to be pulled along by the rotation of said movable upper portion.

30. The sprinkler according to claim 29, wherein said movable upper portion comprises an upper cover and a bottom, elastic means being arranged between said cover and an upper braking ring, said elastic means being suitable for compressing said upper ring against the respective disk.

31. The sprinkler according to claim 30, wherein one of said braking rings is rigidly associated with said bottom so that the pressure exerted by the water on an inner surface of said movable upper portion determines a proportional thrust on said one of said braking rings.

32. The sprinkler according to claim 30, wherein said at least one elbow coupling has an inclination angle ($\theta$) that the line of action of the resultant (R) of the reaction forces exerted by the body on said coupling is substantially directed toward the surfaces of mutual contact between said braking rings and said disks so as to increase the braking action proportionally to the energy of the jet.

33. The sprinkler according to claim 32, wherein the lever arm of said resultant (R) has minimal dimensions, compatibly with the geometry of the coupling, so that the overturning torque of said resultant is approximately centered in an axial region of the joint, proximate to a plurality of gaskets with consequent minimal stresses and local deformations of said gaskets.

34. The sprinkler according to claim 33, wherein said at least one elbow coupling is interchangeable with other ones having different values of said angle ($\theta$) in order to vary the inclination of the jet.

35. A rotating impact sprinkler, comprising:
a tubular body rotatable in a direction about a first axis having a first end in fluid communication with a pressurized water pipe and a second end;
a nozzle secured to said second end from where a fluid jet exits;
an oscillating arm pivotally secured to said tubular body in a direction substantially perpendicular to said first axis;
a deflector pivotally secured to said oscillating arm such that said deflector pivots about an axis substantially parallel to the first axis of said tubular body; and
said deflector is positioned in front of said nozzle distal from said tubular body to periodically interact with said jet to cause rotation of said tubular body.

36. The rotating impact sprinkler as set forth in claim 35, wherein said deflector periodically oscillates between a substantially central equilibrium position and a second position.

37. The rotating impact sprinkler as set forth in claim 36, wherein said jet contacts a portion of said deflector having a minimal cross-section when said deflector is in said substantially central equilibrium position.

38. The rotating impact sprinkler as set forth in claim 37, wherein said jet contacts a portion of said deflector having a maximal cross-section when said deflector is in said second position.

39. The rotating impact sprinkler as set forth in claim 38, wherein said second position is at least one lateral abutment position.

40. The rotating impact sprinkler as set forth in claim 39, wherein said oscillation of the deflector is so sudden as to instantaneously increase the withdrawal of energy from the jet and generate impulsive forces on the deflector and consequently on the arm regardless of the energy from the jet.

* * * * *